United States Patent
Pey

(10) Patent No.: US 11,691,398 B2
(45) Date of Patent: Jul. 4, 2023

(54) MULTILAYER FILMS AND METHODS OF MAKING THE SAME

(71) Applicant: ExxonMobil Chemical Patents Inc., Baytown, TX (US)

(72) Inventor: Chiao-Kiat Pey, Singapore (SG)

(73) Assignee: ExxonMobil Chemical Patents Inc., Baytown, TX (US)

( * ) Notice: Subject to any disclaimer, the term of this patent is extended or adjusted under 35 U.S.C. 154(b) by 3 days.

(21) Appl. No.: 16/760,002

(22) PCT Filed: Oct. 26, 2018

(86) PCT No.: PCT/US2018/057634
§ 371 (c)(1),
(2) Date: Apr. 28, 2020

(87) PCT Pub. No.: WO2019/108326
PCT Pub. Date: Jun. 6, 2019

(65) Prior Publication Data
US 2020/0346440 A1    Nov. 5, 2020

Related U.S. Application Data

(60) Provisional application No. 62/591,568, filed on Nov. 28, 2017.

(51) Int. Cl.
*B32B 27/08* (2006.01)
*B32B 7/12* (2006.01)
*B32B 27/32* (2006.01)

(52) U.S. Cl.
CPC .............. *B32B 27/08* (2013.01); *B32B 7/12* (2013.01); *B32B 27/32* (2013.01); *B32B 2250/03* (2013.01); *B32B 2250/05* (2013.01); *B32B 2250/242* (2013.01); *B32B 2255/26* (2013.01); *B32B 2270/00* (2013.01); *B32B 2307/516* (2013.01); *B32B 2307/518* (2013.01); *B32B 2307/546* (2013.01); *B32B 2307/558* (2013.01); *B32B 2307/72* (2013.01); *B32B 2307/7244* (2013.01); *B32B 2307/7246* (2013.01); *B32B 2307/732* (2013.01); *B32B 2323/04* (2013.01); *B32B 2327/18* (2013.01); *B32B 2439/06* (2013.01); *B32B 2439/70* (2013.01)

(58) Field of Classification Search
None
See application file for complete search history.

(56) References Cited

U.S. PATENT DOCUMENTS

| 5,169,696 A | 12/1992 | Lang et al. |
| 5,741,563 A | 4/1998 | Mehta et al. |
| 6,342,566 B2 | 1/2002 | Burkhardt et al. |
| 6,384,142 B1 | 5/2002 | Burkhardt et al. |
| 2018/0043670 A1* | 2/2018 | Zhu .................. B32B 5/022 |

FOREIGN PATENT DOCUMENTS

| EP | 2875948 | 9/2016 |
| WO | WO 2015-157876 | 10/2015 |
| WO | WO 2015-173199 | 11/2015 |
| WO | WO 2016-128865 | 8/2016 |
| WO | WO 2016-145550 | 9/2016 |
| WO | WO 2017-003775 | 1/2017 |

* cited by examiner

*Primary Examiner* — Samir Shah
(74) *Attorney, Agent, or Firm* — ExxonMobil Technology and Engineering Company—Chemicals

(57) ABSTRACT

Disclosed are multilayer films with at least one MDO substrate.

19 Claims, No Drawings

MULTILAYER FILMS AND METHODS OF MAKING THE SAME

CROSS-REFERENCE OF RELATED APPLICATIONS

This application is a National Phase Application claiming priority to PCT Application Serial No. PCT/US2018/057634, filed Oct. 26, 2018, which claims the benefit of U.S. Provisional Application Ser. No. 62/591,568, filed Nov. 28, 2017, the disclosures of which are incorporated herein by reference in their entirety.

FIELD OF THE INVENTION

This invention relates to films, and in particular, to multilayer films comprising a machine direction oriented (MDO) substrate, laminates comprising such films, and methods for making such films.

BACKGROUND OF THE INVENTION

Stand-up Pouches (SUPs) are commonly known as pouches capable of standing upright on shelves for display to consumers, which have been developed to replace traditional rigid packaging such as bottles and cans for use in flexible packaging industry. SUPs have long been popular with food, home or personal care markets and are also widely used as convenient refill packs for bottles.

Laminate films are generally employed in the industry to prepare SUPs with sufficient stiffness-related and toughness-related properties to ensure package integrity without distortion and rupture, especially during packaging and transportation. Good sealing performance under common heat sealing conditions and, for some applications, barrier to moisture, light and/or oxygen transmission are also desired.

Currently, most of the SUPs in the market are prepared from a flexible laminate film structure, comprising a polyethylene sealant film adhered to a substrate film commonly made of biaxially oriented polyester (PET), biaxially oriented polypropylene (BOPP), or biaxially oriented polyamide (BOPA). Among others, polyamide is well-known for its good oxygen and aroma barrier as well as favored mechanical properties including both toughness and stiffness. However, it has been a long standing challenge for the packaging industry to effectively recycle a laminate structure with a polyamide substrate. Furthermore, it has been difficult for film manufacturers to achieve smooth and flat seals made of polyethylene laminates without having the sealing bar stick to the laminate surface, even with the use of a conventional polytetrafluoroethylene tape, which inevitably leads to compromised operation efficiency.

WO 2017/003775 discloses uniaxially oriented films and packages formed from such films. In one aspect, a uniaxially oriented film comprises (a) a first layer comprising a polyolefin plastomer having a density of 0.865 to 0.908 g/cm³ and a melt index ($I_2$) of 0.5-6 g/10 minutes, and at least one of a single-site catalyzed linear low density polyethylene having a density of 0.912 g/cm³ to 0.935 g/cm³ and a melt index ($I_2$) of 0.5 to 6 g/10 minutes, or a Ziegler-Natta catalyzed ultra-low density polyethylene having a density of 0.880 g/cm³ to 0.912 g/cm³, a melt index ($I_2$) of 0.5 to 6 g/10 minutes, and a MWD of 6.0 or less; (b) a second layer comprising a Ziegler-Natta catalyzed ultra-low density polyethylene having a density of 0.880 g/cm³ to 0.912 g/cm³, a melt index ($I_2$) of 0.5 to 6 g/10 min, and a MWD of 6.0 or less; and (c) at least one inner layer between the first layer and the second layer comprising at least one polyolefin. The film is oriented in the machine direction at a draw ratio of between 4:1 and 10:1, and can exhibit a machine direction 2% secant modulus of 85,000 psi or more when measured as per ASTM D882.

European Patent No. 2,875,948 relates to a multilayer machine direction oriented film comprising at least an (A) layer and (B) layer, at least one of said (A) layer or (B) layer comprising at least 50 wt % of a multimodal linear low density polyethylene (LLDPE) having a density of 905 to 940 kg/m³ and an MFR 2 of 0.01 to 20 g/10 min and comprising a lower molecular weight (LMW) component and a higher molecular weight (HMW) component; wherein said LMW component is an ethylene homopolymer and said HMW component is an ethylene polymer of ethylene with at least two C4-12 alpha olefins; wherein said film is a stretched film which is uniaxially oriented in the machine direction (MD) in a draw ratio of at least 1:3 and has a film thickness of at least 40 microns (after stretching) and wherein said film does not comprise a layer in which more than 50 wt % of said layer comprises a polymer component having a melting point ($T_m$) of 100° C. or less.

WO2015/173199 provides a process for sealing a machine direction oriented polyethylene film to a substrate, preferably to a polyethylene film substrate, comprising bringing said machine direction oriented polyethylene film and said substrate into contact and subjecting at least a part of the contact area to ultrasound so as to form a seal between said film and said substrate; wherein said machine direction oriented polyethylene film comprises a multimodal linear low density polyethylene terpolymer comprising ethylene and at least two C3-20 alpha olefin comonomers and having a density of 905 to 940 kg/m³.

That said, exploring alternative laminate film design with increased recyclability while maintaining other properties at a desired level remains an area of ongoing and intense effort. Applicant has found that such objective can be achieved by preparing a laminate structure with a machine direction oriented (MDO) substrate comprising in the substrate core layer a first polyethylene as described herein in a blend with a second polyethylene having a higher density. The inventive laminate film, in addition to comparable or even improved tensile properties, can demonstrate drop test performance as competent as that achievable with a conventional laminate film of the same thickness using a polyamide substrate. Particularly, in the presence of a sealant also made of polyethylene, the inventive laminate film can be conveniently recycled and can deliver material cost-effectiveness by virtue of the much more inexpensive polyethylenes used to replace polyamide in the substrate. In addition, a polytetrafluoroethylene (PTFE) coated fabric one-sided adhesive tape with liner, when attached to the sealing bar, has been identified as being better at facilitating smooth and flat seals and enhanced productivity during packaging film production than the conventional PTFE tape. Therefore, the inventive laminate design, while presenting a well-accomplished overall property performance, can benefit film manufacturers with mitigated cost pressure and improved production sustainability, preferably accompanied by improved efficiency and convenience during operation, when used to prepare a seal with a PTFE coated fabric one-sided adhesive tape with liner.

SUMMARY OF THE INVENTION

Provided are multilayer films comprising a machine direction oriented (MDO) substrate, laminates comprising such films, and methods for making such films.

In one embodiment, the present invention encompasses a multilayer film comprising a machine direction oriented (MDO) substrate and a sealant, the MDO substrate comprising a substrate outer layer, a substrate inner layer, and a substrate core layer between the substrate outer layer and the substrate inner layer, wherein: (a) the substrate core layer comprises a first polyethylene and a second polyethylene, the first polyethylene having (i) a density of about 0.900 to about 0.925 g/cm$^3$, (ii) a melt index (MI), $I_{2.16}$, of from about 0.1 to about 10.0 g/10 min, (iii) a melt index ratio (MIR), $I_{21.6}/I_{2.16}$, of from about 15 to about 45, (iv) a weight average molecular weight ($M_w$) of from about 20,000 to about 200,000; (v) a molecular weight distribution (MWD) of from about 2.0 to about 5.0; and (vi) a z-average molecular weight ($M_z$) to weight average molecular weight ($M_w$) ($M_z/M_w$) ratio of from about 1.7 to about 3.5; the second polyethylene having a higher density than the first polyethylene; and (b) at least one of the substrate outer layer and the substrate inner layer comprises a third polyethylene, the third polyethylene having a density of about 0.910 to about 0.945 g/cm$^3$, an MI, $I_{2.16}$, of about 0.1 to about 15 g/10 min, an MWD of about 2.5 to about 5.5, and an MIR, $I_{21.6}/I_{2.16}$, of about 25 to about 100.

In another embodiment, the present invention relates to a method for making a multilayer film comprising an MDO substrate and a sealant, comprising the steps of: (a) preparing a substrate outer layer, a substrate inner layer, and a substrate core layer between the substrate outer layer and the substrate inner layer, wherein the substrate core layer comprises a first polyethylene and a second polyethylene, and at least one of the substrate outer layer and the substrate inner layer comprises a third polyethylene; (b) preparing an MDO substrate comprising the layers in step (a); and (c) forming a film comprising the substrate in step (b); wherein the first polyethylene has (i) a density of about 0.900 to about 0.925 g/cm$^3$, (ii) a melt index (MI), $I_{2.16}$, of from about 0.1 to about 10.0 g/10 min, (iii) a melt index ratio (MIR), $I_{21.6}/I_{2.16}$, of from about 15 to about 45, (iv) a weight average molecular weight ($M_w$) of from about 20,000 to about 200,000; (v) a molecular weight distribution (MWD) of from about 2.0 to about 5.0; and (vi) a z-average molecular weight ($M_z$) to weight average molecular weight ($M_w$)($M_z/M_w$) ratio of from about 1.7 to about 3.5; the second polyethylene has a higher density than the first polyethylene; and the third polyethylene has a density of about 0.910 to about 0.945 g/cm$^3$, an MI, $I_{2.16}$, of about 0.1 to about 15 g/10 min, an MWD of about 2.5 to about 5.5, and an MIR, $I_{21.6}/I_{2.16}$, of about 25 to about 100.

The multilayer film described herein or made according to any method disclosed herein may have at least one of the following properties: (i) an average tensile at break of at least about 36 MPa; (ii) an average 1% Secant Modulus of at least about 620 MPa; and (iii) a non-breakage rate of about 100%.

Also provided are laminates comprising any of the multilayer films described herein or made according to any method disclosed herein and seals comprising such laminates.

DETAILED DESCRIPTION OF THE PRESENT INVENTION

Various specific embodiments, versions of the present invention will now be described, including exemplary embodiments and definitions that are adopted herein. While the following detailed description gives specific exemplary embodiments, those skilled in the art will appreciate that these embodiments are exemplary only, and that the present invention can be practiced in other ways. Any reference to the "invention" may refer to one or more, but not necessarily all, of the present inventions defined by the claims. The use of headings is for purposes of convenience only and does not limit the scope of the present invention.

As used herein, a "polymer" may be used to refer to homopolymers, copolymers, interpolymers, terpolymers, etc. A "polymer" has two or more of the same or different monomer units. A "homopolymer" is a polymer having monomer units that are the same. A "copolymer" is a polymer having two or more monomer units that are different from each other. A "terpolymer" is a polymer having three monomer units that are different from each other. The term "different" as used to refer to monomer units indicates that the monomer units differ from each other by at least one atom or are different isomerically. Accordingly, the definition of copolymer, as used herein, includes terpolymers and the like. Likewise, the definition of polymer, as used herein, includes copolymers and the like. Thus, as used herein, the terms "polyethylene," "ethylene polymer," "ethylene copolymer," and "ethylene based polymer" mean a polymer or copolymer comprising at least 50 mol % ethylene units (preferably at least 70 mol % ethylene units, more preferably at least 80 mol % ethylene units, even more preferably at least 90 mol % ethylene units, even more preferably at least 95 mol % ethylene units or 100 mol % ethylene units (in the case of a homopolymer)). Furthermore, the term "polyethylene composition" means a composition containing one or more polyethylene components.

As used herein, when a polymer is referred to as comprising a monomer, the monomer is present in the polymer in the polymerized form of the monomer or in the derivative form of the monomer.

As used herein, when a polymer is said to comprise a certain percentage, wt %, of a monomer, that percentage of monomer is based on the total amount of monomer units in the polymer.

For purposes of this invention and the claims thereto, an ethylene polymer having a density of 0.910 to 0.940 g/cm$^3$ is referred to as a "low density polyethylene" (LDPE); an ethylene polymer having a density of 0.890 to 0.930 g/cm$^3$, typically from 0.910 to 0.930 g/cm$^3$, that is linear and does not contain a substantial amount of long-chain branching is referred to as "linear low density polyethylene" (LLDPE) and can be produced with conventional Ziegler-Natta catalysts, vanadium catalysts, or with metallocene catalysts in gas phase reactors, high pressure tubular reactors, and/or in slurry reactors and/or with any of the disclosed catalysts in solution reactors ("linear" means that the polyethylene has no or only a few long-chain branches, typically referred to as a g' vis of 0.97 or above, preferably 0.98 or above); and an ethylene polymer having a density of more than 0.940 g/cm$^3$ is referred to as a "high density polyethylene" (HDPE).

As used herein, "core" layer, "outer" layer, and "inner" layer are merely identifiers used for convenience, and shall not be construed as limitation on individual layers, their relative positions, or the laminated structure, unless otherwise specified herein.

As used herein, "first" polyethylene, "second" polyethylene, "third" polyethylene, and "fourth" polyethylene are merely identifiers used for convenience, and shall not be construed as limitation on individual polyethylene, their relative order, or the number of polyethylenes used, unless otherwise specified herein.

As used herein, stretch ratio through a machine direction (MD) orientation unit is the ratio of film length before MD orientation to the film length after MD orientation. This is stated, for example, as a stretch ratio of 4, where 4 represents the film length after MD orientation relative to a film of unit length before MD orientation, i.e., the film has been stretched to 4 times the original length. Orientation refers to the alignment of polymer chains in the film.

As used herein, a "laminate" refers to a multilayer structure comprising a sealant and a substrate attached to each other by lamination.

As used herein, "drop test performance" refers to the capability of a loaded stand-up pouch to withstand the sudden shock resulting from a free fall in accordance with ASTM D 5276-98 which is incorporated by reference. The test is conducted in two batches for each formulation, with five pouch samples each first dropped vertically with respect to the ground at a height of one meter ($1^{st}$ batch) and, if passed, then horizontally with respect to the ground at the same height ($2^{nd}$ batch), and, if all passed again, another three pouch samples of the same formulation design each dropped vertically with respect to the ground at a height of 1.5 meters ($3^{rd}$ batch). Each pouch sample is loaded with 833 ml water. The drop test performance is represented by a non-breakage rate as a function of the breakage fraction (fraction of broken bags in each batch) and a predetermined coefficient of each batch, calculated according to the following formula:

$$R=\{1-(R_1 \times c_1+R_2 \times c_2+R_3 \times c_3)/(c_1+c_2+c_3)\} \times 100\%;$$

wherein R is non-breakage rate: $R_1$, $R_2$, and $R_3$ are breakage fractions in the $1^{st}$, $2^{nd}$, and $3^{rd}$ batch, respectively; $c_1$, $c_2$, and $c_3$ are predetermined coefficient of the $1^{st}$, $2^{nd}$, and $3^{rd}$ batch, respectively, wherein $c_1$ is 1, $c_2$ is 2, and $c_3$ is 3. If the $1^{st}$ batch is failed, then $R_2$ and $R_3$ will automatically become 1; if the $1^{st}$ batch is passed but the $2^{nd}$ batch is failed, then $R_3$ will become 1.

Pouch samples are prepared by laminate films formed with either an MDO substrate as described herein or a polyamide substrate. As used herein, a polyamide substrate refers to a 15 μm substrate film of neat biaxially oriented polyamide.

As used herein, film layers that are the same in composition and in thickness are referred to as "identical" layers.

Polyethylene Polymer

In one aspect of the invention, the polyethylene that can be used for the multilayer film made according to the method described herein are selected from ethylene homopolymers, ethylene copolymers, and compositions thereof. Useful copolymers comprise one or more comonomers in addition to ethylene and can be a random copolymer, a statistical copolymer, a block copolymer, and/or compositions thereof. The method of making the polyethylene is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In an exemplary embodiment, the polyethylenes are made by the catalysts, activators and processes described in U.S. Pat. Nos. 6,342,566; 6,384,142; and 5,741,563; and WO 03/040201 and WO 97/19991. Such catalysts are well known in the art, and are described in, for example, ZIEGLER CATALYSTS (Gerhard Fink, Rolf Malhaupt and Hans H. Brintzinger, eds., Springer-Verlag 1995); Resconi et al.; and I, II METALLOCENE-BASED POLYOLEFINS (Wiley & Sons 2000).

Polyethylenes that are useful in this invention include those sold under the trade names ENABLE™, EXACT™, EXCEED™, ESCORENE™, EXXCO™, ESCOR™, PAXON™, and OPTEMA™ (ExxonMobil Chemical Company, Houston, Tex., USA); DOW™, DOWLEX™, ELITE™, AFFINITY™, ENGAGE™, and FLEXOMER™ (The Dow Chemical Company, Midland, Mich., USA); BORSTAR™ and QUEO™ (Borealis AG, Vienna. Austria); and TAFMER™ (Mitsui Chemicals Inc., Tokyo, Japan).

Preferred ethylene homopolymers and copolymers useful in this invention typically have one or more of the following properties:

1. an $M_w$ of 20,000 g/mol or more, 20,000 to 2,000,000 g/mol, preferably 30,000 to 1,000,000, preferably 40,000 to 200,000, preferably 50,000 to 750,000, using a gel permeation chromatograph ("GPC") according to the procedure disclosed herein; and/or 2. a $T_m$ of 30° C. to 150° C., preferably 30° C. to 140° C., preferably 50° C. to 140° C., more preferably 60° C. to 135° C., as determined by second melting curve based on ASTM D3418; and/or 3. a crystallinity of 5% to 80%, preferably 10% to 70%, more preferably 20% to 60%, preferably at least 30%, or at least 40%, or at least 50%, as determined by enthalpy of crystallization curve based on ASTM D3418 and calculated by the following formula:

Crystallinity %=Enthalpy (J/g)/298 (J/g)×100%;

wherein 298 (J/g) is enthalpy of 100% crystallinity polyethylene; and/or 4. a heat of fusion of 300 J/g or less, preferably 1 to 260 J/g, preferably 5 to 240 J/g, preferably 10 to 200 J/g, as determined based on ASTM D3418-03; and/or 5. a crystallization temperature ($T_c$) of 15° C. to 130° C., preferably 20° C. to 120° C., more preferably 25° C. to 110° C., preferably 60° C. to 125° C., as determined based on ASTM D3418-03; and/or 6. a heat deflection temperature of 30° C. to 120° C. preferably 40° C. to 100° C., more preferably 50° C. to 80° C. as measured based on ASTM D648 on injection molded flexure bars, at 66 psi load (455 kPa); and/or 7. a Shore hardness (D scale) of 10 or more, preferably 20 or more, preferably 30 or more, preferably 40 or more, preferably 100 or less, preferably from 25 to 75 (as measured based on ASTM D 2240); and/or 8. a percent amorphous content of at least 50%, preferably at least 60%, preferably at least 70%, more preferably between 50% and 95%, or 70% or less, preferably 60% or less, preferably 50% or less as determined by subtracting the percent crystallinity from 100.

The polyethylene may be an ethylene homopolymer, such as HDPE. In one embodiment, the ethylene homopolymer has a molecular weight distribution ($M_w/M_n$) or (MWD) of up to 40, preferably ranging from 1.5 to 20, or from 1.8 to 10, or from 1.9 to 5, or from 2.0 to 4. In another embodiment, the 1% secant flexural modulus (determined based on ASTM D790A, where test specimen geometry is as specified under the ASTM D790 section "Molding Materials (Thermoplastics and Thermosets)," and the support span is 2 inches (5.08 cm)) of the polyethylene falls in a range of 200 to 1000 MPa, and from 300 to 800 MPa in another embodiment, and from 400 to 750 MPa in yet another embodiment, wherein a desirable polymer may exhibit any combination of any upper flexural modulus limit with any lower flexural modulus limit. The MI of preferred ethylene homopolymers range from 0.05 to 800 dg/min in one embodiment, and from 0.1 to 100 dg/min in another embodiment, as measured based on ASTM D1238 (190° C., 2.16 kg).

In an exemplary embodiment, the polyethylene comprises less than 20 mol % propylene units (preferably less than 15 mol %, preferably less than 10 mol %, preferably less than 5 mol %, and preferably 0 mol % propylene units).

In another embodiment of the invention, the polyethylene useful herein is produced by polymerization of ethylene and, optionally, an alpha-olefin with a catalyst having, as a transition metal component, a bis (n-$C_{3-4}$ alkyl cyclopentadienyl) hafnium compound, wherein the transition metal component preferably comprises from about 95 mol % to about 99 mol % of the hafnium compound as further described in U.S. Pat. No. 9,956,088.

In another embodiment of the invention, the polyethylene is an ethylene copolymer, either random or block, of ethylene and one or more comonomers selected from $C_3$ to $C_{20}$ α-olefins, typically from $C_3$ to $C_{10}$ α-olefins. Preferably, the comonomers are present from 0.1 wt % to 50 wt % of the copolymer in one embodiment, and from 0.5 wt % to 30 wt % in another embodiment, and from 1 wt % to 15 wt % in yet another embodiment, and from 0.1 wt % to 5 wt % in yet another embodiment, wherein a desirable copolymer comprises ethylene and $C_3$ to $C_{20}$ α-olefin derived units in any combination of any upper wt % limit with any lower wt % limit described herein. Preferably the ethylene copolymer will have a weight average molecular weight of from greater than 8,000 g/mol in one embodiment, and greater than 10,000 g/mol in another embodiment, and greater than 12,000 g/mol in yet another embodiment, and greater than 20,000 g/mol in yet another embodiment, and less than 1,000,000 g/mol in yet another embodiment, and less than 800,000 g/mol in yet another embodiment, wherein a desirable copolymer may comprise any upper molecular weight limit with any lower molecular weight limit described herein.

In another embodiment, the ethylene copolymer comprises ethylene and one or more other monomers selected from the group consisting of $C_3$ to $C_{20}$ linear, branched or cyclic monomers, and in some embodiments is a $C_3$ to $C_{12}$ linear or branched alpha-olefin, preferably butene, pentene, hexene, heptene, octene, nonene, decene, dodecene, 4-methyl-pentene-1,3-methyl pentene-1,3,5,5-trimethyl-hexene-1, and the like. The monomers may be present at up to 50 wt %, preferably from up to 40 wt %, more preferably from 0.5 wt % to 30 wt %, more preferably from 2 wt % to 30 wt %, more preferably from 5 wt % to 20 wt %, based on the total weight of the ethylene copolymer.

Preferred linear alpha-olefins useful as comonomers for the ethylene copolymers useful in this invention include $C_3$ to $C_8$ alpha-olefins, more preferably 1-butene, 1-hexene, and 1-octene, even more preferably 1-hexene. Preferred branched alpha-olefins include 4-methyl-1-pentene, 3-methyl-1-pentene, 3,5,5-trimethyl-1-hexene, and 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally, two adjacent substitutions may be joined to form a ring structure. Preferred aromatic-group-containing monomers contain at least one aromatic structure appended to a polymerizable olefinic moiety. Particularly, preferred aromatic monomers include styrene, alpha-methylstyrene, para-alkyl-styrenes, vinyltoluenes, vinylnaphthalene, allyl benzene, and indene, especially styrene, paramethyl styrene, 4-phenyl-1-butene and allyl benzene.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene, or higher ring containing diolefins with or without substituents at various ring positions.

In an exemplary embodiment, one or more dienes are present in the polyethylene at up to 10 wt %, preferably at 0.00001 wt % to 2 wt %, preferably 0.002 wt % to 1 wt %, even more preferably 0.003 wt % to 0.5 wt %, based upon the total weight of the polyethylene. In some embodiments, diene is added to the polymerization in an amount of from an upper limit of 500 ppm, 400 ppm, or 300 ppm to a lower limit of 50 ppm, 100 ppm, or 150 ppm.

Preferred ethylene copolymers useful herein are preferably a copolymer comprising at least 50 wt % ethylene and having up to 50 wt %, preferably 1 wt % to 35 wt %, even more preferably 1 wt % to 6 wt % of a $C_3$ to $C_{20}$ comonomer, preferably a $C_4$ to $C_8$ comonomer, preferably hexene or octene, based upon the weight of the copolymer. Preferably these polymers are metallocene polyethylenes (mPEs).

Useful mPE homopolymers or copolymers may be produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted.

In one embodiment, the multilayer film described herein comprises in the substrate core layer a first polyethylene (as a polyethylene defined herein) having (i) a density of about 0.900 to about 0.925 g/cm$^3$, (ii) a melt index (MI), $I_{2.16}$, of from about 0.1 to about 10.0 g/10 min, (iii) a melt index ratio (MIR), $I_{21.6}/I_{2.16}$, of from about 15 to about 45, (iv) a weight average molecular weight ($M_w$) of from about 20,000 to about 200,000; (v) a molecular weight distribution (MWD) of from about 2.0 to about 5.0; and (vi) a z-average molecular weight ($M_z$) to weight average molecular weight ($M_w$) ($M_z/M_w$) ratio of from about 1.7 to about 3.5.

In another embodiment, the first polyethylene is produced by gas-phase polymerization of ethylene with a catalyst having as a transition metal component a bis(n-$C_{3-4}$ alkyl cyclopentadienyl) hafnium compound, wherein said transition metal component comprises from about 95 mol % to about 99 mol % of said hafnium compound.

The polyethylene polymer that can be used as the first polyethylene in the multilayer film described herein comprises from 70.0 mol % to or 100.0 mol % of units derived from ethylene. The lower limit on the range of ethylene content may be from 70.0 mol %, 75.0 mol %, 80.0 mol %, 85.0 mol %, 90.0 mol %, 92.0 mol %, 94.0 mol %, 95.0 mol %, 96.0 mol %, 97.0 mol %, 98.0 mol %, or 99.0 mol % based on the mol % of polymer units derived from ethylene. The polyethylene polymer may have an upper ethylene limit of 80.0 mol %, 85.0 mol %, 90.0 mol %, 92.0 mol %, 94.0 mol %, 95.0 mol %, 96.0 mol %, 97.0 mol %, 98.0 mol %, 99.0 mol %, 99.5 mol %, or 100.0 mol %, based on polymer units derived from ethylene. For polyethylene copolymers, the polyethylene polymer may have less than 50.0 mol % of polymer units derived from a $C_3$-$C_{20}$ olefin, preferably, an alpha-olefin, e.g., hexene or octene. The lower limit on the range of $C_3$-$C_{20}$ olefin-content may be 25.0 mol %, 20.0 mol %, 15.0 mol %, 10.0 mol %, 8.0 mol %, 6.0 mol %, 5.0 mol %, 4.0 mol %, 3.0 mol %, 2.0 mol %, 1.0 mol %, or 0.5 mol %, based on polymer units derived from the $C_3$-$C_{20}$ olefin. The upper limit on the range of $C_3$-$C_{20}$ olefin-content may be 20.0 mol %, 15.0 mol %, 10.0 mol %, 8.0 mol %, 6.0 mol %, 5.0 mol %, 4.0 mol %, 3.0 mol %, 2.0 mol %, or 1.0 mol %, based on polymer units derived from the $C_3$ to $C_{20}$ olefin. Any of the lower limits may be combined with any of the upper limits to form a range. Comonomer content is based on the total content of all monomers in the polymer.

In a class of embodiments, the first polyethylene may have minimal long chain branching (i.e., less than 1.0 long-chain branch/1000 carbon atoms, preferably particularly 0.05 to 0.50 long-chain branch/1000 carbon atoms). Such values are characteristic of a linear structure that is consistent with a branching index (as defined below) of $g'_{vis} \geq 0.980$, 0.985, $\geq 0.99$, $\geq 0.995$, or 1.0. While such values are indicative of little to no long chain branching, some long chain branches may be present (i.e., less than 1.0 long-chain branch/1000 carbon atoms, preferably less than 0.5 long-chain branch/1000 carbon atoms, particularly 0.05 to 0.50 long-chain branch/1000 carbon atoms).

In some embodiments, the first polyethylene may have a density in accordance with ASTM D-4703 and ASTM D-1505/ISO 1183 of from about 0.900 to about 0.925 g/cm³, from about 0.910 to about 0.923 g/cm³, from about 0.910 to about 0.920 g/cm³, from about 0.915 to about 0.921 g/cm³, from about 0.912 to about 0.918 g/cm³, or from about 0.918 to 0.921 g/cm³.

The weight average molecular weight ($M_w$) of the first polyethylene may be from about 15,000 to about 500,000 g/mol, from about 20,000 to about 200,000 g/mol, from about 25,000 to about 150,000 g/mol, from about 150,000 to about 400,000 g/mol, from about 200,000 to about 400.000 g/mol, or from about 250,000 to about 350.000 g/mol.

The first polyethylene may have a molecular weight distribution (MWD) or ($M_w/M_n$) of from about 1.5 to about 5.0, from about 2.0 to about 5.0, from about 3.0 to about 4.5, or from about 2.5 to about 4.0. MWD is measured using a gel permeation chromatograph ("GPC") on a Waters 150 gel permeation chromatograph equipped with a differential refractive index ("DRI") detector and a Chromatix KMX-6 on line light scattering photometer. The system is used at 135° C. with 1,2,4-trichlorobenzene as the mobile phase using Shodex (Showa Denko America, Inc.) polystyrene gel columns 802, 803, 804, and 805. This technique is discussed in "Liquid Chromatography of Polymers and Related Materials III," J. Cazes editor, Marcel Dekker, 1981, p. 207, which is incorporated herein by reference. Polystyrene is used for calibration. No corrections for column spreading are employed; however, data on generally accepted standards, e.g., National Bureau of Standards Polyethylene 1484 and anionically produced hydrogenated polyisoprenes (alternating ethylene-propylene copolymers) demonstrate that such corrections on MWD are less than 0.05 units. $M_w/M_n$ is calculated from elution times. The numerical analyses are performed using the commercially available Beckman/CIS customized LALLS software in conjunction with the standard Gel Permeation package. Reference to $M_w/M_n$ implies that the $M_w$ is the value reported using the LALLS detector and $M_n$ is the value reported using the DR detector described above.

The first polyethylene may have a z-average molecular weight ($M_z$) to weight average molecular weight ($M_w$) ($M_z/M_w$) ratio greater than about 1.5, or greater than about 1.7, or greater than about 2.0. In some embodiments, this ratio is from about 1.7 to about 3.5, from about 2.0 to about 3.0, or from about 2.2 to about 3.0.

The first polyethylene may have a melt index (MI) or ($I_{2.16}$) as measured by ASTM D-1238-E (190° C./2.16 kg) of about 0.1 to about 300 g/10 min, about 0.1 to about 100 g/10 min, about 0.1 to about 50 g/10 min, about 0.1 g/10 min to about 10.0 g/10 min, about 0.1 g/10 min to about 5.0 g/10 min, about 0.1 g/10 min to about 3.0 g/10 min, about 0.1 g/10 min to about 2.0 g/10 min, about 0.1 g/10 min to about 1.2 g/10 min, about 0.2 g/10 min to about 1.5 g/10 min, about 0.2 g/10 min to about 1.1 g/10 min, about 0.3 g/10 min to about 1.0 g/10 min, about 0.4 g/10 min to about 1.0 g/10 min, or about 0.5 g/10 min to about 1.0 g/10 min.

The first polyethylene may have a melt index ratio (MIR) ($I_{1.6}$ (190° C., 21.6 kg)/$I_{2.16}$ (190° C., 2.16 kg)) of from about 10 to about 50, from about 15 to about 45, from about 20 to about 40, from about 20 to about 35, from about 22 to about 38, from about 20 to about 32, from about 25 to about 31, or from about 28 to about 30.

In a class of embodiments, the first polyethylene may contain less than 5.0 ppm hafnium, less than 2.0 ppm hafnium, less than 1.5 ppm hafnium, or less than 1.0 ppm hafnium. In other embodiments, the polyethylene polymers may contain from about 0.01 ppm to about 2 ppm hafnium, from about 0.01 ppm to about 1.5 ppm hafnium, or from about 0.01 ppm to about 1.0 ppm hafnium.

Typically, the amount of hafnium is greater than the amount of zirconium in the polyethylene polymer. In a particular class of embodiments, the ratio of hafnium to zirconium (ppm-ppm) is at least about 2.0, at least about 10.0, at least about 15, at least about 17.0, at least about 20.0, at least about 25.0, at least about 50.0, at least about 100.0, at least about 200.0, or at least about 500.0 or more. While zirconium generally is present as an impurity in hafnium, it will be realized in some embodiments where particularly pure hafnium-containing catalysts are used, the amount of zirconium may be extremely low, resulting in a virtually undetectable or undetectable amount of zirconium in the polyethylene polymer. Thus, the upper limit on the ratio of hafnium to zirconium in the polymer may be quite large.

In several classes of embodiments, the first polyethylene may have at least a first peak and a second peak in a comonomer distribution analysis, wherein the first peak has a maximum at a log($M_w$) value of 4.0 to 5.4, 4.3 to 5.0, or 4.5 to 4.7; and a TREF elution temperature of 70.0° C. to 100.0° C., 80.0° C. to 95.0° C., or 85.0° C. to 90.0° C. The second peak in the comonomer distribution analysis has a maximum at a log($M_w$) value of 5.0 to 6.0, 5.3 to 5.7, or 5.4 to 5.6; and a TREF elution temperature of 40.0° C. to 60.0° C., 45.0° C. to 60.0° C., or 48.0° C. to 54.0° C.

In several classes of embodiment, the first polyethylene may have a composition distribution breadth index (CDBI) of less than or equal to 55%, less than or equal to 50%, less than or equal to 45%, less than or equal to 40%, or from 20% to 35%. The CDBI may be determined using techniques for isolating individual fractions of a sample of the resin. The preferred technique is Temperature Rising Elution Fraction ("TREF"), as described in Wild, et al., J. Poly. Sci., Poly. Phys. Ed., Vol. 20, p. 441 (1982), which is incorporated herein for purposes of U.S. practice.

In several of the classes of embodiments described above, the first polyethylene may have a Broad Orthogonal Comonomer Distribution or "BOCD." "BOCD" refers to a Broad Orthogonal Composition Distribution in which the comonomer of a copolymer is incorporated predominantly in the high molecular weight chains or species of a polyolefin polymer or composition. The distribution of the short chain branches can be measured, for example, using Temperature Raising Elution Fractionation (TREF) in connection with a Light Scattering (LS) detector to determine the weight average molecular weight of the molecules eluted from the TREF column at a given temperature. The combination of TREF and LS (TREF-LS) yields information about the breadth of the composition distribution and whether the comonomer content increases, decreases, or is uniform across the chains of different molecular weights of polymer chains. BOCD has been described, for example, in U.S. Pat. No. 8,378,043, Col. 3, line 34, bridging Col. 4, line 19, and U.S. Pat. No. 8,476,392, line 43, bridging Col. 16, line 54.

The TREF-LS data reported herein were measured using an analytical size TREF instrument (Polymerchar, Spain), with a column of the following dimension: inner diameter (ID) 7.8 mm and outer diameter (OD) 9.53 mm and a column length of 150 mm. The column was filled with steel beads. 0.5 mL of a 6.4% (w/v) polymer solution in orthodichlorobenzene (ODCB) containing 6 g BHT/4 L were charged onto the column and cooled from 140° C. to 25° C. at a constant cooling rate of 1.0° C./min. Subsequently, the ODCB was pumped through the column at a flow rate of 1.0 ml/min and the column temperature was increased at a constant heating rate of 2° C./min to elute the polymer. The polymer concentration in the eluted liquid was detected by means of measuring the absorption at a wavenumber of 2857 $cm^{-1}$ using an infrared detector. The concentration of the ethylene-α-olefin copolymer in the eluted liquid was calculated from the absorption and plotted as a function of temperature. The molecular weight of the ethylene-α-olefin copolymer in the eluted liquid was measured by light scattering using a Minidawn Tristar light scattering detector (Wyatt, Calif., USA). The molecular weight was also plotted as a function of temperature.

The breadth of the composition distribution is characterized by the $T_{75}$–$T_{25}$ value, wherein $T_{25}$ is the temperature at which 25% of the eluted polymer is obtained and $T_{75}$ is the temperature at which 75% of the eluted polymer is obtained in a TREF experiment as described herein. The composition distribution is further characterized by the $F_{80}$ value, which is the fraction of polymer that elutes below 80° C. in a TREF-LS experiment as described herein. A higher $F_{80}$ value indicates a higher fraction of comonomer in the polymer molecule. An orthogonal composition distribution is defined by a $M_{60}/M_{90}$ value that is greater than 1, wherein $M_{60}$ is the molecular weight of the polymer fraction that elutes at 60° C. in a TREF-LS experiment and $M_{90}$ is the molecular weight of the polymer fraction that elutes at 90° C. in a TREF-LS experiment as described herein.

In a class of embodiments, the first polyethylene as described herein may have a BOCD characterized in that the $T_{75}$–$T_{25}$ value is 1 or greater, 2.0 or greater, 2.5 or greater, 4.0 or greater, 5.0 or greater, 7.0 or greater, 10.0 or greater, 11.5 or greater, 15.0 or greater, 17.5 or greater, 20.0 or greater, or 25.0 or greater, wherein $T_{25}$ is the temperature at which 25% of the eluted polymer is obtained and $T_{75}$ is the temperature at which 75% of the eluted polymer is obtained in a TREF experiment as described herein.

The first polyethylene as described herein may further have a BOCD characterized in that $M_{60}/M_{90}$ value is 1.5 or greater, 2.0 or greater, 2.25 or greater, 2.50 or greater, 3.0 or greater, 3.5 or greater, 4.0 or greater, 4.5 or greater, or 5.0 or greater, wherein $M_{60}$ is the molecular weight of the polymer fraction that elutes at 60° C. in a TREF-LS experiment and $M_{90}$ is the molecular weight of the polymer fraction that elutes at 90° C. in a TREF-LS experiment as described herein.

Additionally, the first polyethylene as described herein may further have a BOCD characterized in that $F_{80}$ value is 1% or greater, 2% or greater, 3% or greater, 4% or greater, 5% or greater, 6% or greater, 7% or greater, 10% or greater, 11% or greater, 12% or greater, or 15% or greater, wherein $F_{80}$ is the fraction of polymer that elutes below 80° C.

Additionally, the melt strength of the first polyethylene polymer at a particular temperature may be determined with a Gottfert Rheotens Melt Strength Apparatus. To determine the melt strength, unless otherwise stated, a polymer melt strand extruded from the capillary die is gripped between two counter-rotating wheels on the apparatus. The take-up speed is increased at a constant acceleration of 2.4 mm/sec². The maximum pulling force (in the unit of cN) achieved before the strand breaks or starts to show draw-resonance is determined as the melt strength. The temperature of the rheometer is set at 190° C. The capillary die has a length of 30 mm and a diameter of 2 mm. The polymer melt is extruded from the die at a speed of 10 mm/sec. The distance between the die exit and the wheel contact point should be 122 mm.

The melt strength of the first polyethylene may be in the range from about 1 to about 100 cN, about 1 to about 50 cN, about 1 to about 25 cN, about 3 to about 15 cN, about 4 to about 12 cN, or about 5 to about 10 cN.

Materials and processes for making the first polyethylene have been described in, for example, U.S. Pat. No. 6,956,088, particularly Example 1; U.S. Publication No. 2009/0297810, particularly Example 1; U.S. Publication No. 2015/0291748, particularly PE1-PE5 in the Examples, and WO 2014/099356, particularly PE3 referenced on page 12 and in the Examples, including the use of a silica supported hafnium transition metal metallocene/methylalumoxane catalyst system described in, for example, U.S. Pat. Nos. 6,242,545 and 6,248,845, particularly Example 1.

The polyethylene polymer suitable for use as the first polyethylene is commercially available from ExxonMobil Chemical Company, Houston, Tex., and sold under Exceed XP™ Performance Polymer. Exceed XP™ Performance Polymer offers step-out performance with respect to, for example, dart drop impact strength, flex-crack resistance, and machine direction (MD) tear, as well as maintaining stiffness at lower densities. Exceed XP™ mPE also offers optimized solutions for a good balance of melt strength, toughness, stiffness, and sealing capabilities which makes this family of polymers well-suited for blown film/cast film solutions.

In another embodiment, the multilayer film described herein may further comprise in the substrate core layer a second polyethylene (as a polyethylene defined herein) having a higher density than the first polyethylene. Preferably, the second polyethylene has a density of about 0.910 to about 0.945 g/cm³, an MI, $I_{2.16}$, of about 0.1 to about 15 g/10 min, an MWD of about 2.5 to about 5.5, and an MIR 12a $I_{2.16}$, of about 25 to about 100. In various embodiments, the second polyethylene may have one or more of the following properties:

(a) a density (sample prepared according to ASTM D-4703, and the measurement according to ASTM D-1505) of about 0.910 to about 0.945 g/cm³, or about 0.920 to about 0.940 g/cm³;

(b) an MI ($I_{2.16}$, ASTM D-1238, 2.16 kg, 190° C.) of about 0.1 to about 15 g/10 min, or about 0.1 to about 10 g/10 min, or about 0.1 to about 5 g/10 min;

(c) an MIR ($I_{21.6}$ (190° C., 21.6 kg)/$I_{2.16}$ (190° C., 2.16 kg)) of greater than 25 to about 100, or greater than 30 to about 90, or greater than 35 to about 80;

(d) a CDBI (determined according to the procedure disclosed herein) of greater than about 50%, or greater than about 60%, or greater than 75%, or greater than 85%;

(e) a MWD of about 2.5 to about 5.5; MWD is measured according to the procedure disclosed herein; and/or (f) a branching index ("g", determined according to the procedure described herein) of about 0.5 to about 0.97, or about 0.7 to about 0.95.

The second polyethylene is not limited by any particular method of preparation and may be formed using any process known in the art. For example, the second polyethylene may be formed using gas phase, solution, or slurry processes.

In one embodiment, the second polyethylene is formed in the presence of a Ziegler-Natta catalyst. In another embodiment, the second polyethylene is formed in the presence of a single-site catalyst, such as a metallocene catalyst (such as any of those described herein). Particularly useful catalyst systems include supported dimethylsilyl bis(tetrahydroindenyl) zirconium dichloride. Polyethylenes useful as the second polyethylene in this invention include those disclosed in U.S. Pat. No. 6,476,171, which is hereby incorporated by reference for this purpose, and include those commercially available from ExxonMobil Chemical Company in Houston, Tex., such as those sold under the trade designation ENABLE™.

In yet another embodiment, the multilayer film described herein may comprise in at least one of the substrate outer layer and the substrate inner layer a third polyethylene (as a polyethylene defined herein), having a density of about 0.910 to about 0.945 g/cm³, an MI, $I_{2.16}$, of about 0.1 to about 15 g/10 min, an MWD of about 2.5 to about 5.5, and an MIR, $I_{21.6}/I_{2.16}$, of about 25 to about 100. In various embodiments, the third polyethylene may have one or more of the properties or be prepared as defined above for the second polyethylene. The third polyethylene may be the same as or different from the second polyethylene. Preferably, the third polyethylene is the same as the second polyethylene.

In an exemplary embodiment, the substrate core layer of the multilayer film described herein further may comprise a fourth polyethylene (as a polyethylene defined herein) having a density of at least about 0.940 g/cm³, preferably about 0.940 g/cm³ to about 0.965 g/cm³. The fourth polyethylene is different from the second polyethylene. The fourth polyethylene is typically prepared with either Ziegler-Natta or chromium-based catalysts in slurry reactors, gas phase reactors, or solution reactors. Ethylene polymers useful as the fourth polyethylene in this invention include those commercially available from ExxonMobil Chemical Company in Houston, Tex., such as HDPE.

The first, the second, and, optionally, the fourth polyethylene polymers present in the substrate core layer, and the third polyethylene present in at least one of the substrate outer layer and the substrate inner layers of the multilayer film described herein may each be optionally in a blend with one or more other polymers, such as polyethylenes defined herein, which blend is referred to as polyethylene composition. In particular, the polyethylene compositions described herein may be physical blends or in situ blends of more than one type of polyethylene or compositions of polyethylenes with polymers other than polyethylenes where the polyethylene component is the majority component, e.g., greater than 50 wt % of the total weight of the composition. Preferably, the polyethylene composition is a blend of two polyethylenes with different densities.

In an exemplary embodiment, the first polyethylene and the second polyethylene present in the substrate core layer of the multilayer film described herein are present in a weight amount ratio of from about 1:5 to about 4:5, for example, about 1:5, about 1:4, about 1:3, about 2:5, about 1:2, about 3:5, about 2:3, about 3:4, about 4:5, or in the range of any combination of the values recited herein. In another exemplary embodiment, at least one of the substrate outer layer and the substrate inner layer of the multilayer film of the present invention comprises the third polyethylene in an amount of from about 80 wt % to about 100 wt %, for example, about 80 wt %, about 82 wt %, about 84 wt %, about 86 wt %, about 90 wt %, about 92 wt %, about 94 wt %, about 96 wt %, about 98 wt %, about 100 wt %, or anywhere between any combination of the values recited herein, based on total weight of polymer in the substrate outer layer or the substrate inner layer.

In one exemplary embodiment where the sealant of the multilayer film described herein comprises a sealant outer layer, a sealant inner layer, and a sealant core layer between the sealant outer layer and the sealant inner layer, the multilayer film described herein may comprise in each of the above layers a polyethylene as described herein, optionally in the form of a polyethylene composition comprising polyethylenes with different densities.

In a class of embodiments, in addition to polyethylene as described above, the multilayer film made according to the present invention may further comprise other polymers, including without limitation other polyolefins, polar polymers, and cationic polymers, in any layer of the substrate and/or the sealant.

Film Structures

The multilayer film made according to the present invention may further comprise additional layer(s), which may be any layer typically included in multilayer film constructions. For example, the additional layer(s) may be made from:

Polyolefins

Preferred polyolefins include homopolymers or copolymers of $C_2$ to $C_{40}$ olefins, preferably $C_2$ to $C_{20}$ olefins, preferably a copolymer of an α-olefin and another olefin or α-olefin (ethylene is defined to be an α-olefin for purposes of this invention). Preferably homopolyethylene, homopolypropylene, propylene copolymerized with ethylene and/or butene, ethylene copolymerized with one or more of propylene, butene or hexene, and optional dienes. Preferred examples include thermoplastic polymers such as ultra-low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and compositions of thermoplastic polymers and elastomers, such as, for example, thermoplastic elastomers and rubber toughened plastics.

Polar Polymers

Preferred polar polymers include homopolymers and copolymers of esters, amides, acetates, anhydrides, copolymers of a $C_2$ to $C_{20}$ olefin, such as ethylene and/or propylene and/or butene with one or more polar monomers, such as acetates, anhydrides, esters, alcohol, and/or acrylics. Preferred examples include polyesters, polyamides, ethylene vinyl acetate copolymers, and polyvinyl chloride.

Cationic Polymers

Preferred cationic polymers include polymers or copolymers of geminally disubstituted olefins, α-heteroatom olefins and/or styrenic monomers. Preferred geminally disubstituted olefins include isobutylene, isopentene, isoheptene, isohexane, isooctene, isodecene, and isododecene. Preferred α-heteroatom olefins include vinyl ether and vinyl carbazole, preferred styrenic monomers include styrene, alkyl styrene, para-alkyl styrene, α-methyl styrene, chloro-styrene, and bromo-para-methyl styrene. Preferred examples of cationic polymers include butyl rubber, isobutylene copolymerized with para methyl styrene, polystyrene, and poly-α-methyl styrene.

Miscellaneous

Other preferred layers can be paper, wood, cardboard, metal, metal foils (such as aluminum foil and tin foil), metallized surfaces, glass (including silicon oxide ($SiO_x$) coatings applied by evaporating silicon oxide onto a film surface), fabric, spunbond fibers, and non-wovens (particularly polypropylene spunbond fibers or non-wovens), and substrates coated with inks, dyes, pigments, and the like.

In particular, the multilayer film described herein can also include layers comprising materials such as ethylene vinyl alcohol (EVOH), polyamide (PA), polyvinylidene chloride (PVDC), or aluminum, so as to obtain barrier performance for the film where appropriate.

The thickness of the multilayer films may range from 10 to 200 μm in general and is mainly determined by the intended use and properties of the film. Stretch films may be thin; those for shrink films or heavy duty bags are much thicker. Conveniently, the film has a thickness of no more than about 170 μm, for example, from 10 to 170 μm, from 20 to 160 μm, from 30 to 150 μm, or from 40 to 120 μm. Preferably, the thickness ratio between the MDO substrate and the sealant is about 1:3 to about 1:7, for example, about 1:3, about 1:4, about 1:5, about 1:6, about 1:7, or in the range of any combination of the values recited herein. Preferably, the thickness ratio between the substrate outer layer, the substrate core layer, and the substrate inner layer is from about 1:2:1 to about 1:6:1, for example, about 1:2:1, about 1:3:1, about 1:4:1, about 1:5:1, or about 1:6:1, or van in the range of any combination of the values recited herein.

In one exemplary embodiment, the sealant of the multilayer film described herein may comprise a sealant outer layer, a sealant inner layer, and a sealant core layer between the sealant outer layer and the sealant inner layer. Preferably, the thickness ratio between the sealant outer layer, the sealant core layer, and the sealant inner layer is from about 1:2:1 to about 1:6:1, for example, about 1:2:1, about 1:3:1, about 1:4:1, about 1:5:1, or about 1:6:1, or vary in the range of any combination of the values recited herein.

The multilayer film described herein may have an A/Y/B structure for the MDO substrate, wherein the A and B layers are a substrate outer layer and a substrate inner layer, respectively, and Y is a substrate core layer in contact with the substrate outer layer and the substrate inner layer. Suitably one or both the substrate outer layer and the substrate inner layers are a skin layer forming one or both substrate surfaces and can serve as a lamination skin (the surface to be adhered to the sealant) or a sealable skin (the surface to form a seal). Preferably, the substrate inner layer serves as the lamination skin to be attached to the sealant. The composition of A and B layers may be the same or different, but conform to the limitations set out herein for the sealant. Preferably, the A and B layers are identical.

The multilayer film described herein may have an A'/Y'/B' structure for the sealant, wherein A' is a sealant outer layer, B' is a sealant inner layer, and Y' is a sealant core layer between the sealant outer layer and the sealant inner layer. Suitably the sealant outer layer and the sealant inner layer are skin layers forming a sealant surface and can respectively serve as a lamination skin (the surface to be adhered to the substrate) and a sealable skin (the surface to form a seal). Preferably, the sealant outer layer is attached to the substrate inner layer. The composition of A' and B' layers may be the same or different, but conform to the limitations set out herein for the sealant. Preferably, A' and B' layers are different. More preferably, the sealant inner layer has a density lower than that of the sealant outer layer.

In an exemplary embodiment, the multilayer film comprises an MDO substrate having an A/Y/B structure and a sealant having an A'/Y'/B' structure, wherein the MDO substrate comprises a substrate outer layer, a substrate inner layer, and a substrate core layer between the substrate outer layer and the substrate inner layer, wherein: (a) the substrate core layer comprises a first polyethylene, a second polyethylene, and a fourth polyethylene, wherein the first polyethylene has (i) a density of about 0.900 to about 0.925 g/cm³, (ii) a melt index (MI), $I_{2.16}$, of from about 0.1 to about 10.0 g/10 min, (iii) a melt index ratio (MIR), $I_{21.6}/I_{2.16}$, of from about 15 to about 45, (iv) a weight average molecular weight ($M_w$) of from about 20,000 to about 200,000; (v) a molecular weight distribution (MWD) of from about 2.0 to about 5.0; and (vi) a z-average molecular weight ($M_z$) to weight average molecular weight ($M_w$) ($M_z/M_w$) ratio of from about 1.7 to about 3.5; wherein the second polyethylene has a higher density than the first polyethylene; the second polyethylene having a density of about 0.940 to about 0.945 g/cm³, an MI, $I_{2.16}$, of about 0.1 to about 15 g/10 min, an MWD of about 2.5 to about 5.5, and an MIR, $I_{21.6}/I_{2.16}$, of about 25 to about 100; wherein the fourth polyethylene has a density of at least about 0.940 g/cm³, the fourth polyethylene different from the second polyethylene; wherein the weight amount ratio between the first polyethylene and the second polyethylene in the substrate core layer is about 2:3 to about 4:5; and (b) each of the substrate outer layer and the substrate inner layer comprises about 100 wt % of the second polyethylene, based on total weight of polymer in the layer; wherein the thickness ratio between the substrate outer layer, the substrate core layer, and the substrate inner layer is about 1:4:1; wherein the sealant comprises a sealant outer layer, a sealant inner layer, and a sealant core layer between the sealant outer layer and the sealant inner layer, each comprising polyethylene, wherein the sealant inner layer has a density lower than that of the sealant outer layer; wherein the thickness ratio between the sealant outer layer, the sealant core layer, and the sealant inner layer is 1:2:1; wherein the substrate inner layer is attached to the sealant outer layer and the thickness ratio between the substrate and the sealant is about 1:5 to about 1:6.

Film Properties and Applications

The multilayer films of the present invention may be adapted to form flexible packaging laminate films, including stand-up pouches, as well as a wide variety of other applications, such as cling film, low stretch film non-stretch wrapping film, pallet shrink over-wrap, agricultural, and collation shrink film. The film structures that may be used for bags are prepared such as sacks, trash bags and liners, industrial liners, produce bags, and heavy duty bags. The film may be used in flexible packaging, food packaging, e.g., fresh cut produce packaging, frozen food packaging, bundling, packaging and unitizing a variety of products.

The inventive multilayer film described herein may have at least one of the following properties: (i) an average tensile at break of at least about 36 MPa; (ii) an average 1% Secant Modulus of at least about 620 MPa; and (iii) a non-breakage rate of about 100%.

It has been discovered that the multilayer film design as set out herein, particularly by use of the first polyethylene described herein in a blend with the second polyethylene described herein to form the core layer of an MDO substrate, can advantageously and economically address the long-standing difficulty in recycling a polyethylene-based laminate structure having a polyamide-based substrate while at the same time allowing for desired mechanical performance including drop test performance and tensile properties to satisfy quality standards required by end-users of packaging films.

Methods for Making the Multilayer Film

Also provided are methods for making multilayer films of the present invention. A method for making a multilayer film may comprise the step of: (a) preparing a substrate outer layer, a substrate inner layer, and a substrate core layer between the substrate outer layer and the substrate inner layer, wherein the substrate core layer comprises a first polyethylene and a second polyethylene, and at least one of the substrate outer layer and the substrate inner layer comprises a third polyethylene; (b) preparing an MDO substrate comprising the layers in step (a); and (c) forming a film comprising the substrate in step (b); wherein the first polyethylene has (i) a density of about 0.900 to about 0.925 g/cm$^3$, (ii) a melt index (MI), $I_{2.16}$, of from about 0.1 to about 10.0 g/10 min, (iii) a melt index ratio (MIR), $I_{21.6}/I_{2.16}$, of from about 15 to about 45, (iv) a weight average molecular weight ($M_w$) of from about 20,000 to about 200,000; (v) a molecular weight distribution (MWD) of from about 2.0 to about 5.0; and (vi) a z-average molecular weight ($M_z$) to weight average molecular weight ($M_w$) ($M_z/M_w$) ratio of from about 1.7 to about 3.5; the second polyethylene has a higher density than the first polyethylene; and the third polyethylene has a density of about 0.910 to about 0.945 g/cm$^3$, an MI $I_{2.16}$ of about 0.1 to about 15 g/10 min, an MWD of about 2.5 to about 5.5, and an MIR, $I_{21.6}/I_{2.16}$, of about 25 to about 100. Preferably, the method may further comprise after step (b) a step of preparing a sealant comprising a sealant outer layer, a sealant inner layer, and a sealant core layer between the sealant outer layer and the sealant inner layer. Preferably, the film in step (c) is formed by laminating the sealant to the substrate, so that the substrate inner layer is attached to the sealant outer layer.

At least one of the substrate and the sealant of the multilayer films described herein may be formed by any of the conventional techniques known in the art including blown extrusion, cast extrusion, coextrusion, blow molding, casting, and extrusion blow molding.

In one embodiment of the invention, at least one of the substrate and the sealant of the multilayer films described herein is formed by using blown techniques, i.e., to form a blown film. For example, the polymer composition formulated as described herein can be extruded in a molten state through an annular die and then blown and cooled to form a tubular, blown film, which can then be axially slit and unfolded to form a flat film. As a specific example, blown films can be prepared as follows. The polymer composition is introduced into the feed hopper of an extruder, such as a 50 mm extruder that is water-cooled, resistance heated, and has an L/D ratio of 30:1. The film can be produced using a 28 cm die with a 1.4 mm die gap, along with a dual air ring and internal bubble cooling. The film is extruded through the die into a film cooled by blowing air onto the surface of the film. The film is drawn from the die typically forming a cylindrical film that is cooled, collapsed and, optionally, subjected to a desired auxiliary process, such as slitting, treating, sealing, or printing. Typical melt temperatures are from about 180° C. to about 230° C. Blown film rates are generally from about 3 to about 25 kilograms per hour per inch (about 4.35 to about 26.11 kilograms per hour per centimeter) of die circumference. The finished film can be wound into rolls for later processing. A particular blown film process and apparatus suitable for forming films according to embodiments of the present invention is described in U.S. Pat. No. 5,569,693. Of course, other blown film forming methods can also be used.

In blown film extrusion, the film may be pulled upwards by, for example, pinch rollers after exiting from the die and is simultaneously inflated and stretched transversely sideways to an extent that can be quantified by the blow up ratio (BUR). The inflation provides the transverse direction (TD) stretch, while the upwards pull by the pinch rollers provides a machine direction (MD) stretch. As the polymer cools after exiting the die and inflation, it crystallizes and a point is reached where crystallization in the film is sufficient to prevent further MD or TD orientation. The location at which further MD or TD orientation stops is generally referred to as the "frost line" because of the development of haze at that location.

Variables in this process that determine the ultimate film properties include the die gap, the BUR and TD stretch, the take up speed and MD stretch and the frost line height. Certain factors tend to limit production speed and are largely determined by the polymer rheology including the shear sensitivity which determines the maximum output and the melt tension which limits the bubble stability, BUR and take up speed.

In a class of embodiments, the substrate of the multilayer film described herein is subject to machine direction orientation (MD orientation). Some methods of producing a polymer film suitable for MD orientation subsequent to the film making may be blown and cast film methods. Particular blown film methods include extruding the polyethylene composition through an annular die to form an extruded tube of molten material to provide the tube with a tube diameter which is substantially the annular die diameter. At the same time, continuously extruding the tube, expanding the tube, downstream of said annular die, to attenuate the walls thereof to form the tube of molten material into a bubble of a bubble diameter which exceeds (i) the annular die diameter and (ii) the tube diameter. The bubble has a frost line which comprises a demarcation line between the molten material and crystalline film.

Some films suitable for MD orientation described herein are made by a cast film process. Typically, in a cast film process, forming the polyethylene composition into a film includes melt extruding the polyethylene composition through a flat or slot die to form an extrudate that is continuously moved onto a polished turning roller, where it is quenched from one side. The speed of the roller controls the draw ratio and final film thickness.

Increased stretch ratio reduces final film thickness. The film may then be then sent to a second roller for cooling on the other side. Typically, although not necessarily, the film passes through a system of rollers and is wound onto a roll. Most flat dies are of T-slot or coat hanger designs, which contain a manifold to spread the flowing polymer across the width of the die, followed downstream by alternating narrow and open slits to create the desired flow distribution and pressure drop.

Suitable blown film and cast film process are described in detail in "Plastics Films" by John H. Briston, Longman Scientific and Technical, 1986, which is incorporated herein by reference in its entirety.

Films suitable for MD orientation have a gauge (or thickness as defined above) before MD orientation ranging from 10 to 120 µm. The lower limit of film gauge before MD orientation can be 10, 15, 20, 25, 30, 40, 45, 50, 60, 70, or 80 µm. The upper limit on gauge before MD orientation can be 120, 110, 100, 90, 80, 70, 60, 50, 40, 35, 30, 25, or 20 µm.

Any combination of lower and upper limits (where upper limit>lower limit) should be considered to be disclosed by the above limits, e.g., 10 to 120 µm, 20 to 120 µm, 30 to 120 µm, 50 to 120 µm, 40 to 110 µm, 40 to 100 µm, etc. In certain exemplary embodiments, the film before MD orientation has a gauge of 50 to 120 µm.

This application is directed to orientation of polymer films formed by either cast or blown processes after the film polymer is no longer in its molten state and has solidified having a crystalline structure. MD orientation can be achieved by any known MD orientation process either in-line or off-line with the extrusion on cast films or blown films. That is, the film produced by blown or cast process can either be temporarily stored (off-line) before MD orientation or can be fed directly (in-line) to the MD orientation equipment.

Orientation methods may be with or without heat added. Cold drawing or stretching are suitable methods. When the film is heated, no case will the polymer be heated above its melting temperature.

A preferred MD orientation process can consist of heating the film to an orientation temperature, preferably using a set of temperature controlled rollers. The orientation temperature may be up to the polymer's melt temperature. Next the heated film is fed into a slow drawing roll with a nip roller, which has the same rolling speed as the heating rollers. The film then enters a fast drawing roller having a speed that is, for example, 1.5 to 12 times faster than the slow draw roll, which effectively orients (stretches) the film on a continuous basis. The oriented film then enters annealing thermal rollers, which allow stress relaxation by holding the film at an elevated temperature for a period of time. The annealing temperature is preferably within, or slightly below (e.g., 10 to 20° C. below but not lower than room temperature, for purposes here room temperature is 23° C.), the same temperature range as used for stretching. Finally, the film is cooled through cooling rollers to an ambient temperature to produce a machine direction oriented (MDO) film.

In an exemplary embodiment, the MDO substrate of the multilayer film described herein is formed with a stretch ratio of from about 4.6 to about 5.0, more preferably from about 4.7 to about 4.8.

The MDO substrate can have a gauge after MD orientation ranging from 10 to 110 µm. The lower limit of film gauge after MD orientation can be 10, 15, 20, 25, 30, 40, 50, 60, 70, or 80 µm. The upper limit on gauge after MD orientation can be 110, 100, 80, 70, 60, 50, 40, 30, 25, or 20 µm. Any combination of lower and upper limits, where upper limit is >lower limit, should be considered to be disclosed by the above limits, e.g., 10 to 100 µm, 10 to 50 µm, 15 to 40 µm, 20 to 30 µm, 30 to 90 µm, 40 to 110 µm, 40 to 100 µm, etc. In certain exemplary embodiments, the film after MD orientation has a gauge of 15 to 40 µm.

The inventive laminate structure prepared as described herein can be formed by laminating respective lamination skins of the sealant to the substrate as previously described herein using any process known in the art, including solvent based adhesive lamination, solvent less adhesive lamination, extrusion lamination, heat lamination, etc. Suitably, the multilayer film described herein is formed by laminating the sealant to the substrate, so that the substrate inner layer is attached to the sealant outer layer.

In one particular desirable embodiment, the method described herein may further comprise after the multilayer film described herein is formed a step of forming a seal comprising the multilayer film, suitably by sealing together respective sealable skins of the MDO substrate and the sealant. The seal described herein can be made by any process such as extrusion coating, lamination, sheet extrusion, injection molding or cast film processes. Preferably, the seal is formed by attaching to the sealing bar a PTFE coated fabric one-sided adhesive tape with liner. In addition to the inventive laminate design described herein, it has also been surprisingly found that use of a PTFE coated fabric one-sided adhesive tape with liner during manufacture of packaging films can allow for a higher sealing temperature than the maximum level that a conventional PTFE tape can tolerate before the sealing bar starts to adhere to the laminate surface thus can have adequate heat transferred to the sealing bar across the laminate film, so that smooth and flat seals and operation convenience that used to be difficult with conventional PTFE tapes can be expected.

EXAMPLES

The present invention, while not meant to be limited by, may be better understood by reference to the following examples and tables.

Example 1

Example 1 illustrates tensile properties demonstrated by an inventive laminate film sample (Sample 1) having an MDO substrate formulated as set out herein in comparison with a comparative sample (Samples 1a) of the same thickness having a polyamide substrate. Polyethylene and additive products used in the samples include: PE-1 polymer (as the first polyethylene described herein) (prepared with a bis (n-propylcyclopentadienyl) hafnium dichloride metallocene catalyst as further described in U.S. Pat. No. 6,956,088;

density: 0.916 g/cm³; MI: 0.50 g/10 min; MIR: 29.6; $M_w$: 156,768; MWD: 3.3; MM: 2.4) (ExxonMobil Chemical Company, Houston, Tex., USA), PE-2 polymer (as the second and the third polyethylenes described herein) (density: 0.940 g/cm³; MI: 0.25 g/10 min; MIR: >60; MWD: ~4) (ExxonMobil Chemical Company, Houston, Tex., USA), EXXONMOBIL™ HDPE HTA 108 HDPE resin (as the fourth polyethylene described herein) (density: 0.961 g/cm³; MI: 0.70 g/10 min) (ExxonMobil Chemical Company, Houston, Tex., USA), ENABLE™ 20-05HH mPE resin (as a polyethylene described herein) (density: 0.920 g/cm³; MI: 0.50 g/10 min)(ExxonMobil Chemical Company, Houston, Tex. USA), ENABLE™ 35-05HH mPE resin (density: 0.935 g/cm³, MI: 0.5 g/10 min) (ExxonMobil Chemical Company, Houston, Tex., USA), EXCEED™ 1012MK mPE resin (as a polyethylene described herein) (density: 0.912 g/cm³; MI: 1.0 g/10 min) (ExxonMobil Chemical Company, Houston, Tex., USA), EXCEED™ 2018 KB mPE resin (as a polyethylene described herein) (density: 0.918 g/cm³; MI: 2.0 g/10 min) (ExxonMobil Chemical Company, Houston, Tex., USA), AFFINITY™ PL 1881G polyolefin plastomer (as a polyethylene described herein) (density: 0.904 g/cm³; MI: 1.0 g/10 min)(The Dow Chemical Company, Midland, Mich., USA); and Ampacet Lamite 98 P 11989-KP white masterbatch (Ampacet (Thailand) Co., Ltd., Thailand). Both samples were prepared on W&H coextrusion blown film line with a BUR of 2.8. The substrate of Sample 1 with an A/Y/B structure were prepared at a layer thickness ratio of 1:4:1 and then subject to MD orientation at a stretch ratio of 4.7, while sealants of both samples with an A'/Y'/B' structure at a layer thickness ratio of 1:2:1. Samples were conditioned at 23° C.±2° C. and 50% 10% relative humidity for at least 40 hours prior to determination of tensile properties.

Tensile properties of the films were measured by a method which is based on ASTM D882 with static weighing and a constant rate of grip separation using a Zwick 1445 tensile tester with a 200 N. Since rectangular shaped test samples were used, no additional extensometer was used to measure extension. The nominal width of the tested film sample is 15 mm and the initial distance between the grips is 50 mm. Tensile strength at break is defined as the tensile stress at break point during the extension test, expressed in load per unit area (MPa). A pre-load of 0.1 N was used to compensate for the so called TOE region at the origin of the stress-strain curve. The constant rate of separation of the grips is 5 mm/min upon reaching the pre-load and 5 mm/min to measure 1% Secant modulus (up to 1% strain). 1% Secant modulus is calculated by drawing a tangent through two well defined points on the stress-strain curve. The reported value corresponds to the stress at 1% strain (with x correction). The result is expressed as load per unit area (MPa). The value is an indication of the film stiffness in tension. The 1% Secant modulus is used for thin film and sheets as no clear proportionality of stress to strain exists in the initial part of the curve. The film samples were tested in both MD and TD for tensile strength at break and 1% Secant modulus and test results are expressed by the average value of MD and TD readings.

Structure-wise formulations (based on total weight of the layer) and layer thickness of the samples, accompanied by test results therefor, are depicted in Table 1.

As shown in Table 1, at a given thickness of the laminate structure, the inventive multilayer film featuring an MDO substrate as described herein can outperform the comparative sample with a conventional polyamide substrate in terms of tensile strength at break and 1% Secant modulus, indicating the role that the MDO substrate described herein plays in maintaining or even improving tensile properties of the overall laminate film.

TABLE 1

Structure-wise formulations (wt %), layer thickness, and test results of Samples 1 & 1a

| Sample No. | Structure | Thickness (μm) | Outer Layer | Core Layer | Inner Layer | Tensile at Break (MPa) | 1% Secant Modulus (MPa) |
|---|---|---|---|---|---|---|---|
| 1 | Substrate | 25 | PE-2 (100) | PE-1 (30) PE-2 (40) EXXONMOBIL ™ HDPE HTA 108 (30) | PE-2 (100) | 38 | 656 |
|   | Sealant | 135 | ENABLE ™ 35-05HH (65) ENABLE ™ 20-05HH (35) | EXXONMOBIL ™ HDPE HTA 108 (50) ENABLE ™ 35-05HH (40) Ampacet Lamite 98 P 11989-KP (10) | EXCEED ™ 1012MK (40) ENABLE ™ 20-05HH (20) AFFINITY ™ PL 1881G (40) |   |   |
| 1a | Substrate | 15 | Polyamide (100) |   |   | 34 | 573 |
|   | Sealant | 145 | EXCEED ™ 2018KB (75) ENABLE ™ 20-05HH (25) | ENABLE ™ 35-05HH (90) Ampacet Lamite 98 P 11989-KP (10) | EXCEED ™ 2018KB (75) ENABLE ™ 20-05HH (25) |   |   |

Example 2

Another inventive film sample (Sample 2) was prepared with a sealant layer distribution of 1:3:1 and formulation of the sealant outer layer and the sealant core layer as shown in Table 2 but otherwise identical with Sample 1. Drop test were conducted for all three samples per described herein for comparison of drop test performance. Test results and non-breakage rates calculated therefrom are demonstrated in Table 3.

TABLE 2

Structure-wise formulations (wt %) and layer thickness of Sample 2

| Sample No. | Structure | Thickness (μm) | Outer Layer | Core Layer | Inner Layer |
|---|---|---|---|---|---|
| 2 | Substrate | 25 | PE-2 (100) | PE-1 (30)<br>PE-2 (40)<br>EXXONMOBIL ™ HDPE HTA 108 (30) | PE-2 (100) |
| | Sealant | 135 | PE-2 (70)<br>ENABLE ™ 20-05HH (30) | PE-1 (30)<br>PE-2 (35)<br>EXXONMOBIL ™ HDPE HTA 108 (35) | EXCEED ™ 1012MK (40)<br>ENABLE ™ 20-05HH (20)<br>AFFINITY ™ PL 1881G (40) |

TABLE 3

Breakage fraction ($R_{1-3}$) for each batch and non-breakage rate (R) calculated therefrom for Samples 1, 2, and 1a

| Sample No. | $R_1$ | $R_2$ | $R_3$ | R |
|---|---|---|---|---|
| 1 | 0 | 0 | 0 | 100% |
| 2 | 0 | 0 | 0 | 100% |
| 1a | 0 | 0 | 0 | 100% |

It can be seen from Table 3 that drop test performance of the laminate structure, if not improved, would be maintained at a comparable level by replacement of the conventional polyamide substrate with the MDO substrate described herein, whether the sealant is otherwise formulated in the sealant core layer with the first and the second polyethylenes described herein. Therefore, without being bound by theory, the inventive film can deliver advantages in material recycle at a reduced manufacture cost without compromising other desired properties.

All documents described herein are incorporated by reference herein, including any priority documents and/or testing procedures. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A multilayer film, comprising a machine direction oriented (MDO) substrate and a sealant, the MDO substrate comprising a substrate outer layer, a substrate inner layer, and a substrate core layer between the substrate outer layer and the substrate inner layer, wherein:
   (a) the substrate core layer comprises a first polyethylene and a second polyethylene,
      the first polyethylene having (i) a density of about 0.900 to about 0.925 g/cm$^3$, (ii) a melt index (MI), $I_{2.16}$, of from about 0.1 to about 10.0 g/10 min, (iii) a melt index ratio (MIR), $I_{21.6}/I_{2.16}$, of from about 15 to about 45, (iv) a weight average molecular weight ($M_w$) of from about 20,000 to about 200,000; (v) a molecular weight distribution (MWD) of from about 2.0 to about 5.0; (vi) a z-average molecular weight ($M_z$) to weight average molecular weight ($M_w$) ($M_z/M_w$) ratio of from about 1.7 to about 3.5, (vii) a composition distribution breadth index (CDBI) of less than or equal to 50%, (viii) a broad orthogonal comonomer distribution (BOCD), and (ix) at least a first peak and a second peak in a comonomer distribution analysis, wherein the first peak has a maximum at a log($M_w$) value of 4.0 to 5.4, and the second peak in the comonomer distribution analysis has a maximum at a log($M_w$) value of 5.0 to 6.0; and
      the second polyethylene having (i) a higher density than the first polyethylene, in the range of from about 0.910 to about 0.945 g/cm$^3$, (ii) a melt index (MI), $I_{2.16}$, of from about 0.1 to about 15.0 g/10 min, (iii) a melt index ratio (MIR), $I_{21.6}/I_{2.16}$, of from about 25 to about 100; (iv) a molecular weight distribution (MWD) of from about 2.5 to about 5.5; and (v) a composition distribution breadth index (CDBI) greater than about 50%; wherein the weight amount ratio between the first polyethylene and the second polyethylene in the substrate core layer is from about 1:5 to about 4:5; and
   (b) each of the substrate outer layer and the substrate inner layer comprises a third polyethylene, the third polyethylene having a density of about 0.910 to about 0.945 g/cm$^3$, an MI, $I_{2.16}$, of about 0.1 to about 15 g/10 min, an MWD of about 2.5 to about 5.5, and an MIR, $I_{21.6}/I_{2.16}$, of about 25 to about 100;
   wherein the MDO substrate is produced by application of stretch ratio of at least about 4.6 subsequent to production of the substrate, and the multilayer film has at least one of the following properties: (i) an average tensile at break of at least about 36 MPa; (ii) an average 1% Secant Modulus of at least about 620 MPa; and (iii) a non-breakage rate of about 100%.

2. The multilayer film of claim 1, wherein the second polyethylene has a density of about 0.940 to about 0.945 g/cm$^3$, an MI, $I_{2.16}$, of about 0.1 to about 15 g/10 min, an MWD of about 2.5 to about 5.5, and an MIR, $I_{21.6}/I_{2.16}$, of about 25 to about 100.

3. The multilayer film of claim 1, wherein the second polyethylene is the same as the third polyethylene.

4. The multilayer film of claim 1, wherein the substrate core layer further comprises a fourth polyethylene having a density of at least about 0.940 g/cm$^3$, the fourth polyethylene different from the second polyethylene.

5. The multilayer film of claim 1, wherein the substrate outer layer and the substrate inner layer are identical.

6. The multilayer film of claim 1, wherein the thickness ratio between the substrate outer layer, the substrate core layer, and the substrate inner layer is from about 1:2:1 to about 1:6:1.

7. The multilayer film of claim 1, wherein the sealant comprises a sealant outer layer, a sealant inner layer, and a sealant core layer between the sealant outer layer and the sealant inner layer, each comprising polyethylene.

8. The multilayer film of claim 7, wherein the sealant inner layer has a density lower than that of the sealant outer layer.

9. The multilayer film of claim 7, wherein the thickness ratio between the sealant outer layer, the sealant core layer, and the sealant inner layer is from about 1:2:1 to about 1:6:1.

10. A multilayer film, comprising an MDO substrate and a sealant, wherein the MDO substrate comprises a substrate outer layer, a substrate inner layer, and a substrate core layer between the substrate outer layer and the substrate inner layer, wherein:
   (a) the substrate core layer comprises a first polyethylene, a second polyethylene, and a fourth polyethylene, wherein the first polyethylene has (i) a density of about 0.900 to about 0.925 g/cm$^3$, (ii) a melt index (MI), $I_{2.16}$, of from about 0.1 to about 10.0 g/10 min, (iii) a melt index ratio (MIR), $I_{21.6}/I_{2.16}$, of from about 15 to about 45, (iv) a weight average molecular weight ($M_w$) of from about 20,000 to about 200,000; (v) a molecular weight distribution (MWD) of from about 2.0 to about 5.0; (vi) a z-average molecular weight ($M_z$) to weight average molecular weight ($M_w$) ($M_z/M_w$) ratio of from about 1.7 to about 3.5, (vii) and composition distribution breadth index (CDBI) of less than or equal to 50%, (viii) a broad orthogonal comonomer distribution (BOCD), and (ix) at least a first peak and a second peak in a comonomer distribution analysis, wherein the first peak has a maximum at a $\log(M_w)$ value of 4.0 to 5.4, and the second peak in the comonomer distribution analysis has a maximum at a $\log(M_w)$ value of 5.0 to 6.0; wherein the second polyethylene has a higher density than the first polyethylene; the second polyethylene having a density of about 0.940 to about 0.945 g/cm$^3$, an MI, $I_{2.16}$, of about 0.1 to about 15 g/10 min, an MWD of about 2.5 to about 5.5, and an MIR, $I_{21.6}/I_{2.16}$, of about 25 to about 100; wherein the fourth polyethylene has a density of at least about 0.940 g/cm$^3$, the fourth polyethylene different from the second polyethylene; wherein the weight amount ratio between the first polyethylene and the second polyethylene in the substrate core layer is about 2:3 to about 4:5; and
   (b) each of the substrate outer layer and the substrate inner layer comprises about 100 wt % of the second polyethylene, based on total weight of polymer in the layer;
   wherein the thickness ratio between the substrate outer layer, the substrate core layer, and the substrate inner layer is about 1:4:1;
   wherein the sealant comprises a sealant outer layer, a sealant inner layer, and a sealant core layer between the sealant outer layer and the sealant inner layer, each comprising polyethylene, wherein the sealant inner layer has a density lower than that of the sealant outer layer;
   wherein the thickness ratio between the sealant outer layer, the sealant core layer, and the sealant inner layer is 1:2:1;
   wherein the substrate inner layer is attached to the sealant outer layer and the thickness ratio between the substrate and the sealant is about 1:5 to about 1:6;
   wherein the multilayer film has at least one of the following properties: (i) an average tensile at break of at least about 36 MPa; (ii) an average 1% Secant Modulus of at least about 620 MPa; and (iii) a non-breakage rate of about 100%.

11. A laminate comprising the multilayer film of claim 10.

12. A seal comprising the laminate of claim 11.

13. The seal of claim 12, wherein the seal is formed by using a polytetrafluoroethylene coated fabric one-sided adhesive tape with liner.

14. A method for making the multilayer film of claim 1, comprising the steps of:
   (a) preparing the substrate outer layer, the substrate inner layer, and the substrate core layer between the substrate outer layer and the substrate inner layer;
   (b) preparing the MDO substrate comprising the layers in step (a); and forming the multilayer film of claim 1 from the MDO substrate of step (b).

15. The method of claim 14, further comprising after step (b) a step of preparing the sealant, wherein the sealant comprises a sealant outer layer, a sealant inner layer, and a sealant core layer between the sealant outer layer and the sealant inner layer.

16. The method of claim 15, wherein at least one of the substrate and the sealant is formed by blown extrusion, cast extrusion, coextrusion, blow molding, casting, or extrusion blow molding.

17. The method of claim 16, wherein the film in step (c) is formed by laminating the sealant to the substrate, so that the substrate inner layer is attached to the sealant outer layer.

18. The method of claim 17, further comprising after step (c) a step of forming a seal comprising the film in step (c).

19. The method of claim 18, wherein the seal is formed by using a polytetrafluoroethylene coated fabric one-sided adhesive tape with liner.

* * * * *